United States Patent
Chepizhenko et al.

(10) Patent No.: US 11,790,625 B2
(45) Date of Patent: *Oct. 17, 2023

(54) MESSAGING SYSTEM WITH AUGMENTED REALITY MESSAGES

(71) Applicant: Snap Inc., Santa Monica, CA (US)

(72) Inventors: Oleksandr Chepizhenko, Marina Del Rey, CA (US); Jean Luo, Seattle, WA (US); Bogdan Maksymchuk, Los Angeles, CA (US); Vincent Sung, Los Angeles, CA (US); Ashley Michelle Wayne, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,829

(22) Filed: Jan. 13, 2023

(65) Prior Publication Data

US 2023/0146298 A1 May 11, 2023

Related U.S. Application Data

(63) Continuation of application No. 17/392,607, filed on Aug. 3, 2021, now Pat. No. 11,636,661, which is a (Continued)

(51) Int. Cl.
*G06T 19/20* (2011.01)
*H04L 51/046* (2022.01)
(Continued)

(52) U.S. Cl.
CPC .............. *G06T 19/20* (2013.01); *G02B 1/041* (2013.01); *G02B 27/0172* (2013.01);
(Continued)

(58) Field of Classification Search
CPC .... G06T 19/20; G02B 1/041; G02B 27/0172; G02B 2027/0134; G06F 3/011; G06F 3/0482
(Continued)

(56) References Cited

U.S. PATENT DOCUMENTS 7,027,054 B1 * 4/2006 Cheiky .................. H04N 5/262
  345/473
7,971,156 B2 6/2011 Albertson et al.
(Continued)

FOREIGN PATENT DOCUMENTS

CN          103049761       8/2016
EP           3707693        9/2020
(Continued)

OTHER PUBLICATIONS

"U.S. Appl. No. 16/542,710, Non Final Office Action dated Oct. 9, 2020", 10 pgs.
(Continued)

*Primary Examiner* — Javid A Amini
(74) *Attorney, Agent, or Firm* — Schwegman Lundberg & Woessner, P.A.

(57) ABSTRACT

A method of generating an augmented reality lens comprises: causing to display a list of lens categories on a display screen of a client device; receiving a user choice from the displayed list; causing to prepopulate a lens features display on the display device based on the user choice, wherein each lens feature comprises image transformation data configured to modify or overlay video or image data; receiving a user selection of a lens feature from the prepopulated lens display; receiving a trigger selection that activates the lens feature to complete the lens; and saving the completed lens to a memory of a computer device.

18 Claims, 15 Drawing Sheets

Related U.S. Application Data continuation of application No. 16/542,710, filed on Aug. 16, 2019, now Pat. No. 11,151,794.

(60) Provisional application No. 62/868,740, filed on Jun. 28, 2019.

(51) Int. Cl.
    *H04L 51/043*     (2022.01)
    *G06T 19/00*     (2011.01)
    *H04L 51/10*     (2022.01)
    *G02B 1/04*     (2006.01)
    *G02B 27/01*     (2006.01)
    *G06F 3/01*     (2006.01)
    *G06F 3/0482*     (2013.01)

(52) U.S. Cl.
    CPC ............ *G06F 3/011* (2013.01); *G06F 3/0482* (2013.01); *G06T 19/006* (2013.01); *H04L 51/043* (2013.01); *H04L 51/046* (2013.01); *H04L 51/10* (2013.01); *G02B 2027/0134* (2013.01); *G06T 2219/2012* (2013.01); *G06T 2219/2024* (2013.01)

(58) Field of Classification Search
    USPC .......................................................... 345/633
    See application file for complete search history.

(56) References Cited

U.S. PATENT DOCUMENTS

| | | |
|---|---|---|
| 7,996,793 B2 | 8/2011 | Latta et al. |
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,584,456 B2 | 2/2017 | Son et al. |
| 9,705,831 B2 | 7/2017 | Spiegel |
| 9,742,713 B2 | 8/2017 | Spiegel et al. |
| 9,761,053 B2 | 9/2017 | Dzhurinskiy et al. |
| 10,102,423 B2 | 10/2018 | Shaburov et al. |
| 10,255,730 B2 | 4/2019 | Dzhurinskiy et al. |
| 10,284,508 B1 | 5/2019 | Allen et al. |
| 10,354,386 B1 | 7/2019 | Farnsworth et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,614,855 B2 | 4/2020 | Huang |
| 10,733,808 B2 | 8/2020 | Dzhurinskiy et al. |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,024,101 B1 | 6/2021 | Chepizhenko et al. |
| 11,030,454 B1 | 6/2021 | Xiong et al. |
| 11,036,368 B1 | 6/2021 | Al Majid et al. |
| 11,042,046 B2 | 6/2021 | Chumbley et al. |
| 11,062,498 B1 | 7/2021 | Voss et al. |
| 11,086,148 B2 | 8/2021 | Chumbley et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,151,794 B1 | 10/2021 | Chepizhenko et al. |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2007/0172155 A1* | 7/2007 | Guckenberger ...... G06F 16/583 707/E17.02 |
| 2009/0012788 A1 | 1/2009 | Gilbert et al. |
| 2010/0007665 A1 | 1/2010 | Smith et al. |
| 2011/0258526 A1 | 10/2011 | Supakkul et al. |
| 2011/0301934 A1 | 12/2011 | Tardif |
| 2012/0203639 A1 | 8/2012 | Webster et al. |
| 2012/0212414 A1* | 8/2012 | Osterhout ............... G06F 1/163 345/158 |
| 2012/0251079 A1 | 10/2012 | Meschter et al. |
| 2013/0117692 A1 | 5/2013 | Padmanabhan et al. |
| 2013/0298025 A1 | 11/2013 | Lewis et al. |
| 2014/0092127 A1* | 4/2014 | Kruglick ................. G06F 21/84 345/629 |
| 2014/0171036 A1 | 6/2014 | Simmons |
| 2014/0191976 A1* | 7/2014 | Peevers .................. G09B 5/067 345/173 |
| 2015/0120293 A1 | 4/2015 | Wohlert et al. |
| 2015/0205126 A1 | 7/2015 | Schowengerdt |
| 2015/0277686 A1 | 10/2015 | Laforge et al. |
| 2015/0302505 A1 | 10/2015 | Di et al. |
| 2015/0370320 A1 | 12/2015 | Connor |
| 2016/0027066 A1* | 1/2016 | Sachson ............. G06Q 30/0275 705/14.71 |
| 2016/0086379 A1 | 3/2016 | Sadi et al. |
| 2017/0019633 A1 | 1/2017 | Shaburov et al. |
| 2017/0060230 A1* | 3/2017 | Faaborg ............. G06F 3/04883 |
| 2017/0061694 A1* | 3/2017 | Giraldi ....................... G06F 3/16 |
| 2017/0123487 A1 | 5/2017 | Hazra et al. |
| 2017/0228939 A1 | 8/2017 | Dzhurinskiy et al. |
| 2017/0277684 A1 | 9/2017 | Dharmarajan Mary |
| 2017/0277685 A1 | 9/2017 | Takumi |
| 2017/0286756 A1 | 10/2017 | Yu et al. |
| 2017/0351910 A1 | 12/2017 | Elwazer et al. |
| 2018/0025219 A1* | 1/2018 | Baldwin ................. H04L 51/10 382/118 |
| 2018/0096537 A1 | 4/2018 | Kornilov et al. |
| 2018/0122148 A1 | 5/2018 | Janzer et al. |
| 2018/0154260 A1 | 6/2018 | Sawaki |
| 2018/0158370 A1 | 6/2018 | Pryor |
| 2018/0276480 A1 | 9/2018 | Peterson et al. |
| 2018/0286138 A1 | 10/2018 | Dzhurinskiy et al. |
| 2018/0300917 A1 | 10/2018 | Barnett et al. |
| 2019/0050427 A1 | 2/2019 | Wiesel et al. |
| 2019/0129518 A1 | 5/2019 | Africk |
| 2019/0132272 A1* | 5/2019 | Africk ...................... G06F 16/86 |
| 2019/0146219 A1* | 5/2019 | Rodriguez, II ......... G06F 1/163 345/633 |
| 2019/0197792 A1 | 6/2019 | Dzhurinskiy et al. |
| 2019/0244696 A1 | 8/2019 | Ghai |
| 2019/0313146 A1 | 10/2019 | Kakuschke et al. |
| 2020/0020173 A1* | 1/2020 | Sharif ...................... G06T 19/20 |
| 2020/0104039 A1* | 4/2020 | Robertson .............. G06N 3/045 |
| 2020/0170564 A1 | 6/2020 | Jiang et al. |
| 2020/0250410 A1 | 8/2020 | Hosseinkhani Loorak et al. |
| 2020/0272306 A1 | 8/2020 | Barkman et al. |
| 2020/0286273 A1* | 9/2020 | Chen ...................... G06T 11/60 |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0183164 A1 | 6/2021 | Chepizhenko et al. |
| 2021/0241529 A1 | 8/2021 | Cowbum et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0366196 A1 | 11/2021 | Chepizhenko et al. |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |

(56) References Cited

U.S. PATENT DOCUMENTS

| | | |
|---|---|---|
| 2022/0326781 A1 | 10/2022 | Hwang et al. |
| 2022/0334649 A1 | 10/2022 | Hwang et al. |

FOREIGN PATENT DOCUMENTS

| | | |
|---|---|---|
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

OTHER PUBLICATIONS

"U.S. Appl. No. 16/542,710, Examiner Interview Summary dated Nov. 17, 2020", 3 pgs.
"U.S. Appl. No. 16/542,710, Response filed Nov. 20, 2020 to Non Final Office Action dated Oct. 9, 2020", 9 pgs.
"U.S. Appl. No. 16/588,568, Non Final Office Action dated Dec. 18, 2020", 18 pgs.
"U.S. Appl. No. 16/588,568, Response filed Jan. 12, 2021 to Non Final Office Action dated Dec. 18, 2020", 10 pgs.
"U.S. Appl. No. 16/588,568, Notice of Allowance dated Jan. 22, 2021", 7 pgs.
"U.S. Appl. No. 16/542,710, Final Office Action dated Feb. 4, 2021", 14 pgs.
"U.S. Appl. No. 16/542,710, Response filed Feb. 25, 2021 to Final Office Action dated Feb. 4, 2021", 8 pgs.
"U.S. Appl. No. 16/542,710, Non Final Office Action dated Apr. 2, 2021", 13 pgs.
"U.S. Appl. No. 16/542,710, Response filed Apr. 28, 2021 to Non Final Office Action dated Apr. 2, 2021", 9 pgs.
"U.S. Appl. No. 16/588,568, Corrected Notice of Allowability dated Apr. 29, 2021", 4 pgs.
"U.S. Appl. No. 16/542,710, Notice of Allowance dated Jun. 24, 2021", 9 pgs.
"U.S. Appl. No. 17/182,765, Non Final Office Action dated Dec. 24, 2021", 21 pgs.
"U.S. Appl. No. 17/182,765, Examiner Interview Summary dated Jan. 13, 2022", 2 pgs.
"U.S. Appl. No. 17/182,765, Response filed Feb. 16, 2022 to Non Final Office Action dated Dec. 24, 2021", 9 pgs.
"U.S. Appl. No. 17/182,765, Final Office Action dated Apr. 22, 2022", 20 pgs.
"U.S. Appl. No. 17/182,765, Examiner Interview Summary dated Jun. 29, 2022", 2 pgs.
"U.S. Appl. No. 17/182,765, Response filed Jul. 21, 2022 to Final Office Action dated Apr. 22, 2022", 9 pgs.
"U.S. Appl. No. 17/182,765, Non Final Office Action dated Aug. 17, 2022", 19 pgs.
"U.S. Appl. No. 17/392,607, Non Final Office Action dated Oct. 21, 2022", 8 pgs.
"U.S. Appl. No. 17/182,765, Response filed Oct. 26, 2022 to Non Final Office Action dated Aug. 17, 2022", 9 pgs.
"U.S. Appl. No. 17/182,765, Examiner Interview Summary dated Oct. 27, 2022", 2 pgs.
"U.S. Appl. No. 17/392,607, Examiner Interview Summary dated Nov. 2, 2022", 2 pgs.
"U.S. Appl. No. 17/392,607, Response filed Nov. 21, 2022 to Non Final Office Action dated Oct. 21, 2022", 1 pgs.
"U.S. Appl. No. 17/392,607, Notice of Allowance dated Dec. 12, 2022", 7 pgs.
"U.S. Appl. No. 17/182,765, Final Office Action dated Jan. 6, 2023", 20 pgs.
Kamil, Ismaila Adeniyi, "Makeup-Invariant Face Recognition using combined Gabor Filter Bank and Histogram of Oriented Gradients", ACM ICAIP '18, Chengdu, CN, (Jun. 16-18, 2018), 5 pgs.
Parihar, Rishubh, "Scene Adaptive Cosmetic Makeup Transfer", ACM ICVGIP, Hyderabad, IN, (Dec. 18-22, 2018), 7 pgs.
Park, Jisoo, "An Automatic Virtual Makeup Scheme Based on Personal Color Analysis,", ACM IMCOM '18, Langkawi, MY, (Jan. 5-7, 2018), 7 pgs.
U.S. Appl. No. 16/542,710 U.S. Pat. No. 11,151,794, filed Aug. 16, 2019, Messaging System With Augmented Reality Messages.
U.S. Appl. No. 17/392,607 U.S. Pat. No. 11,636,661, filed Aug. 3, 2021, Messaging System With Augmented Reality Messages.
U.S. Appl. No. 16/588,568 U.S. Pat. No. 11,024,101, filed Sep. 30, 2019, Messaging System With Augmented Reality Variant Generation.
U.S. Appl. No. 17/182,765, filed Feb. 23, 2021, Messaging System With Augmented Reality Variant Generation.

\* cited by examiner

MESSAGING SYSTEM WITH AUGMENTED REALITY MESSAGES

CROSS REFERENCE TO RELATED APPLICATIONS

This application is a continuation of and claims priority to and incorporates by reference U.S. patent application Ser. No. 17/392,607, filed Aug. 3, 2021, which application is a continuation of and claims priority to and incorporates by reference U.S. patent application Ser. No. 16/542,710, filed Aug. 16, 2019, now issued as U.S. Pat. No. 11,151,794, which claims priority to and incorporates by reference U.S. provisional patent application no. 62/868,740 filed Jun. 28, 2019.

TECHNICAL FIELD

An embodiment of the present subject matter relates generally to messaging systems and, more specifically, to generating augmented reality lenses for use in messaging systems.

BACKGROUND

Augmented reality is the display of the physical world and/or physical objects therein with an overlay of computer-generated perceptual information. The computer-generated perceptual information is not limited to visually-perceived data but can also include auditory data and haptic feedback. The overlaid information may be constructive (adding to the display) and/or destructive (masking of the display).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments enable users to create augmented reality lenses using templates or to create a new lens using preexisting lens features. Users can further add two-dimensional images/video to the lenses, such as logos. Choices of templates for users can be prepopulated based on industry and/or lens categories. For example, templates can be organized by industry, such as food & beverage, Personal Care & Beauty, etc. Lens Categories can include Most popular, upcoming holidays, animals, etc.

Users can create new lenses by selecting lens features, such as morphing an image, and a trigger to activate the lens feature. Lens features can include adding a headdress such as a hat, headband, party hat, etc.; glasses, visual effects, color filters, face effects such as shape/morphing, applying cosmetics, etc.

Once a user has generated a lens based on templates or lens features, users can add 2D overlays, such as logos, product image, and/or other images. In addition, users can add music/sounds to the lens. Accordingly, users, such as advertisers, can quickly generate lenses for advertising or other purposes based on templates or lens features for use in a communication system, such as an ephemeral messaging system.

Figure 1:
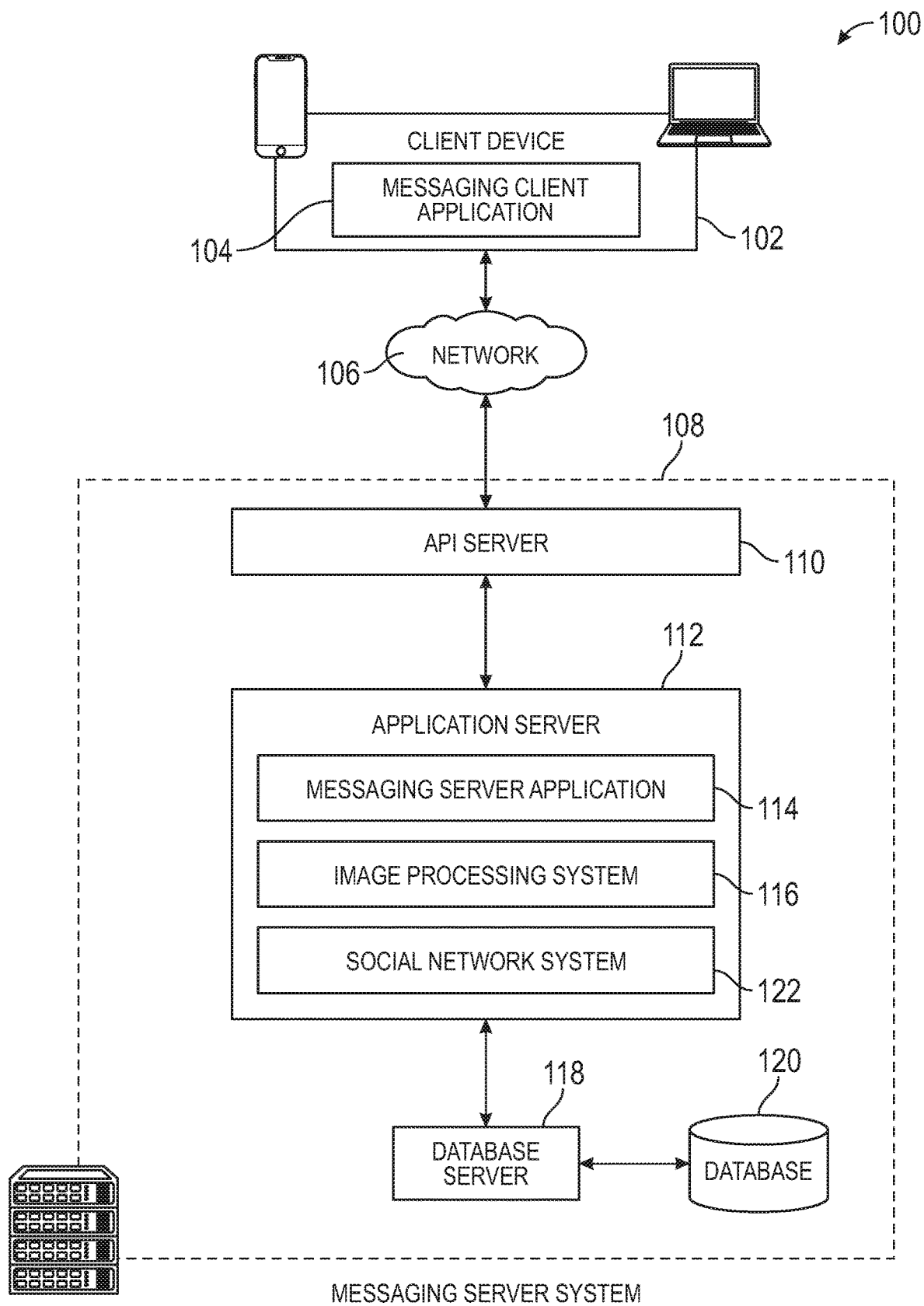
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
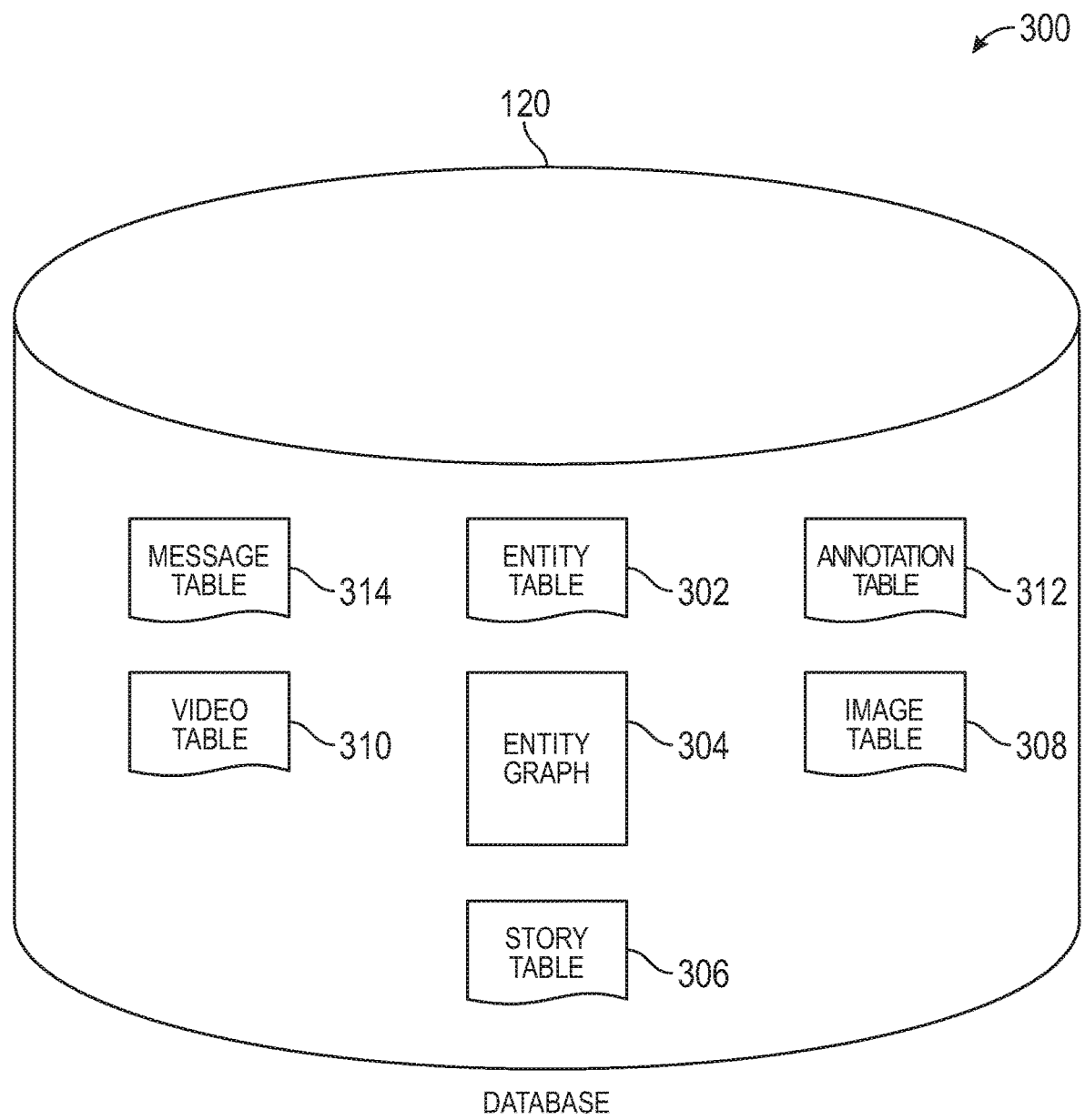
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
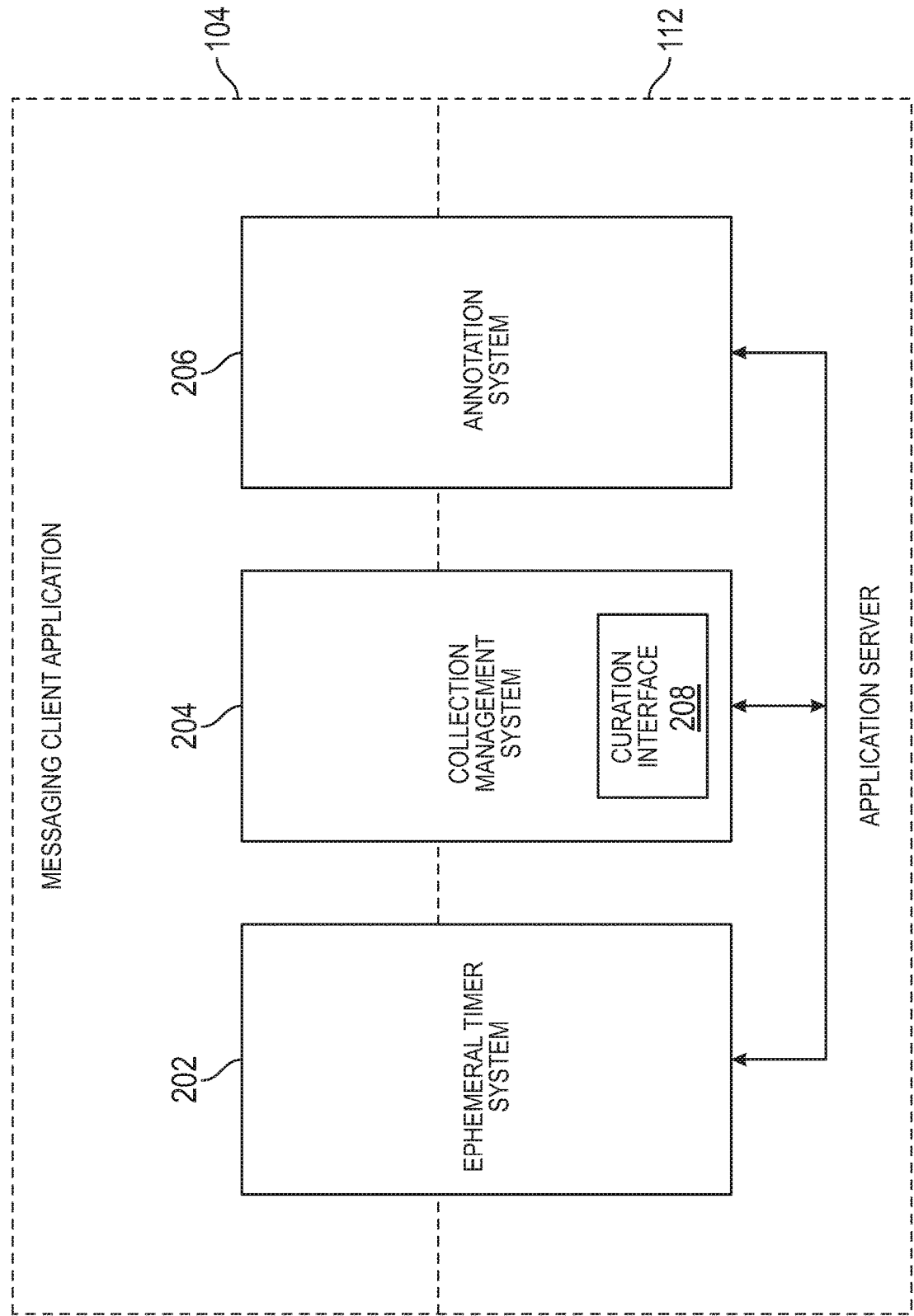
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102, In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques, example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
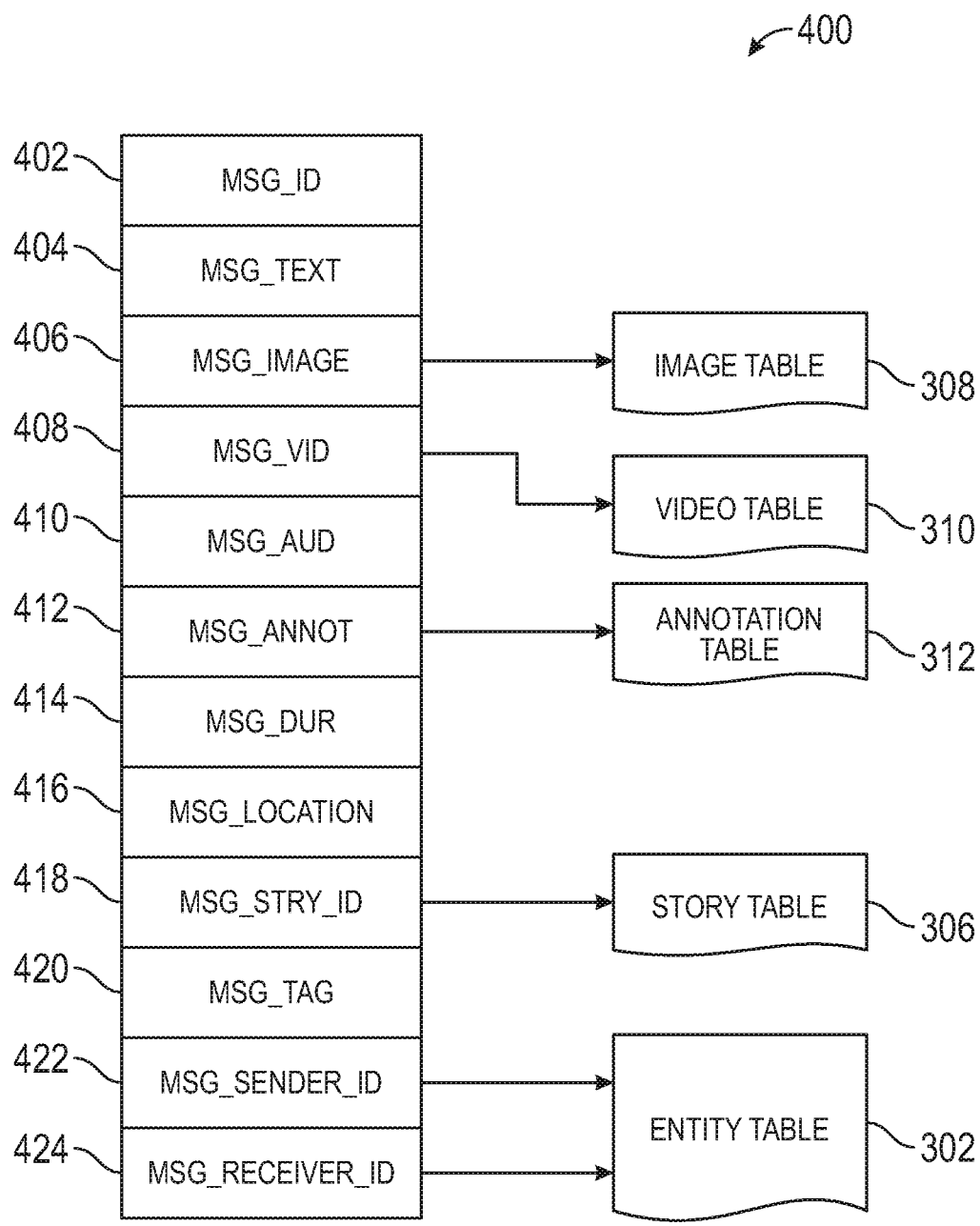
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from a memory component of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from a memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent
- A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
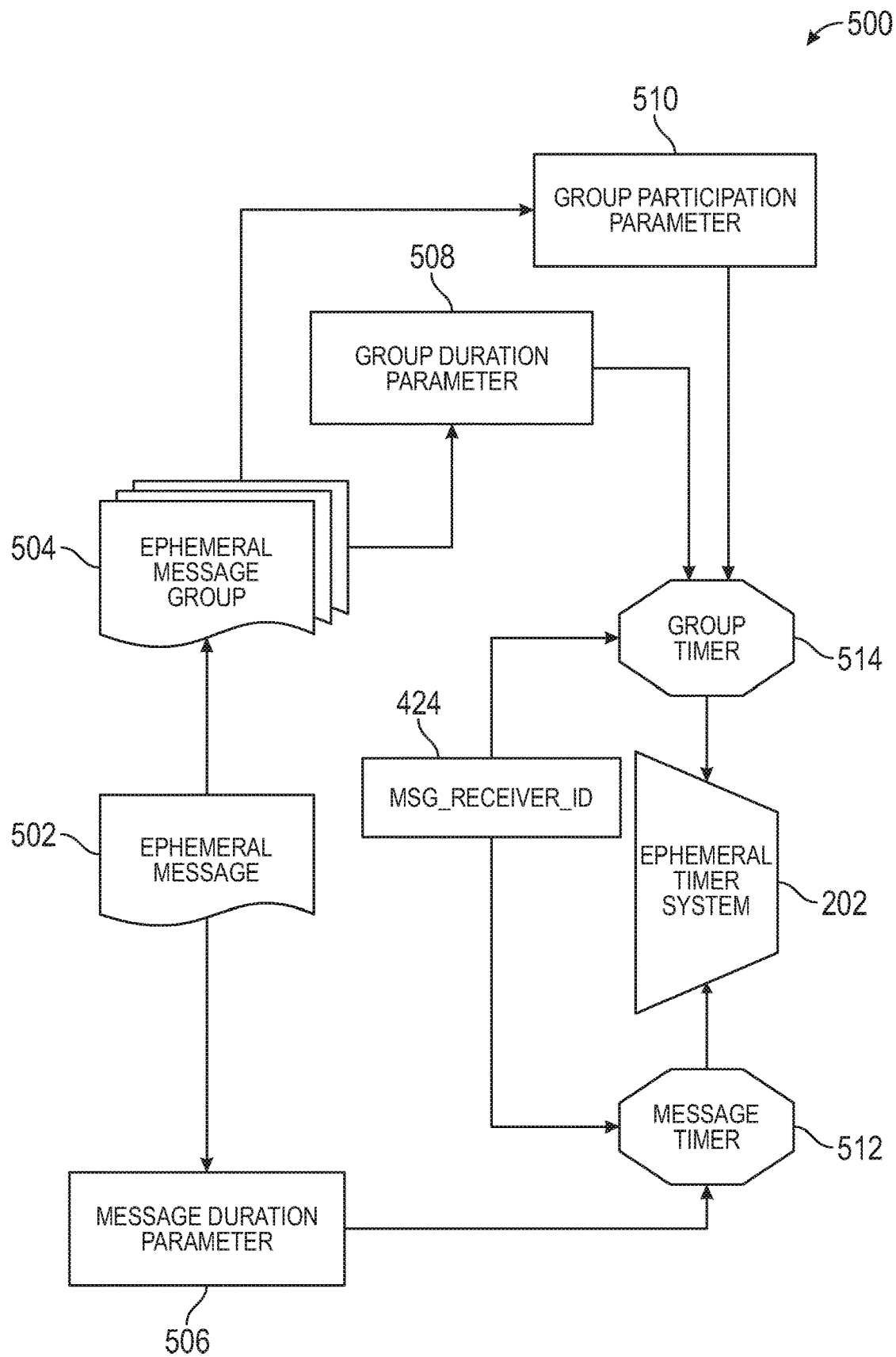
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral tinier system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
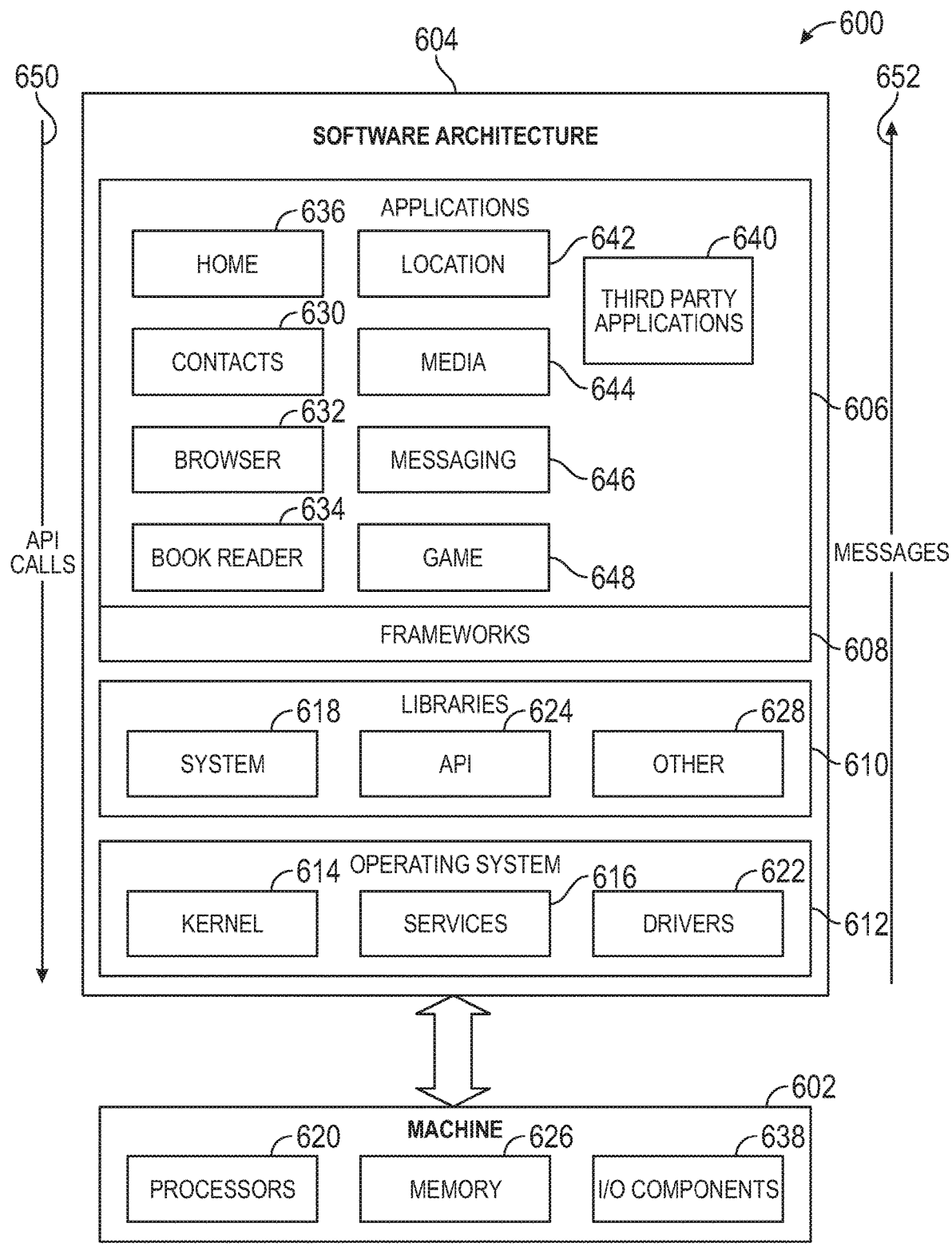
FIG. 6 is block diagram showing a software architecture within which the present disclosure may be implemented, in accordance with some example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
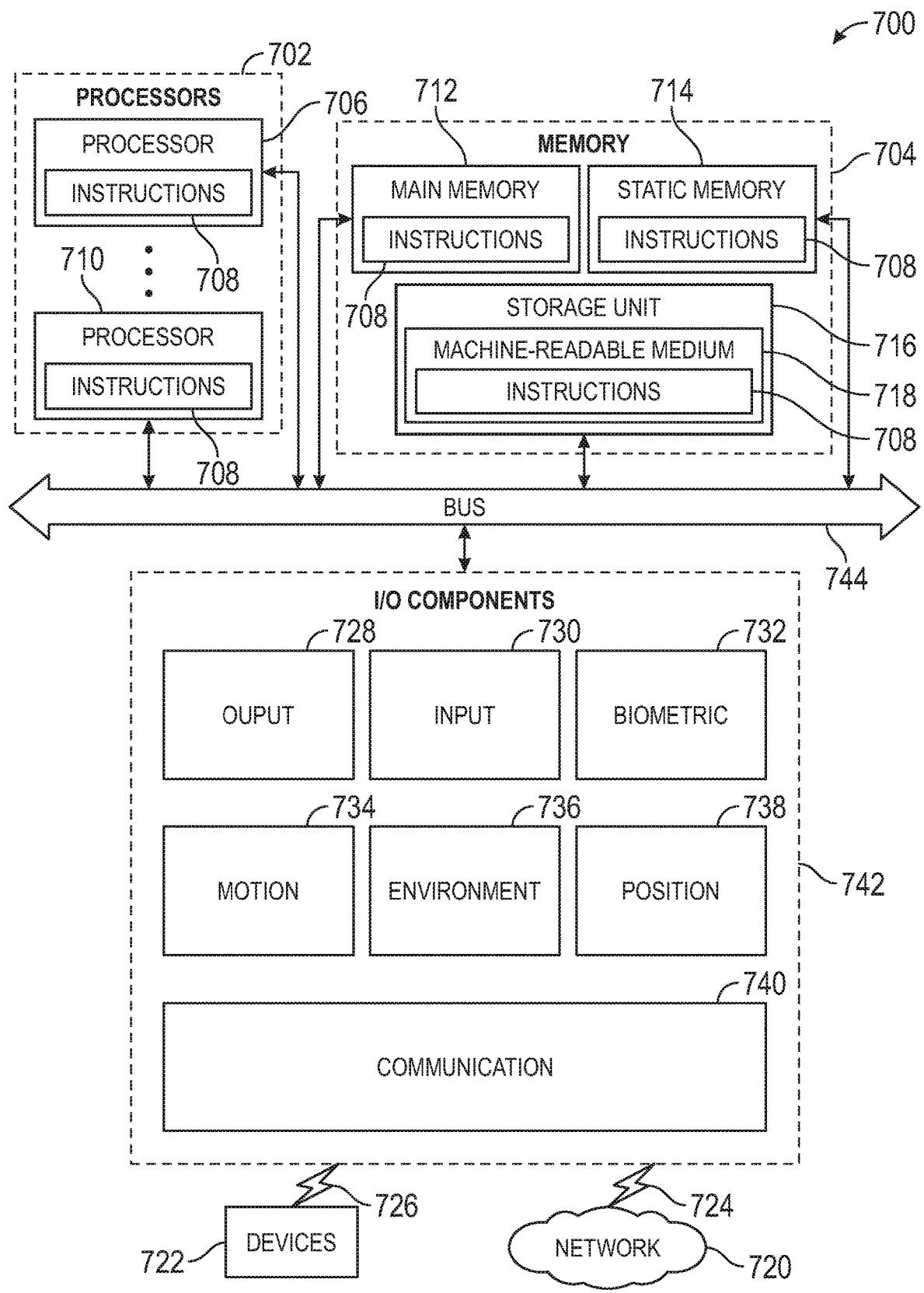
FIG. 7 is a diagrammatic representation of a machine, in the form of a computer system within which a set of instructions may be executed for causing the machine to perform any one or more of the methodologies discussed, in accordance with some example embodiments.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth, The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Figure 8:
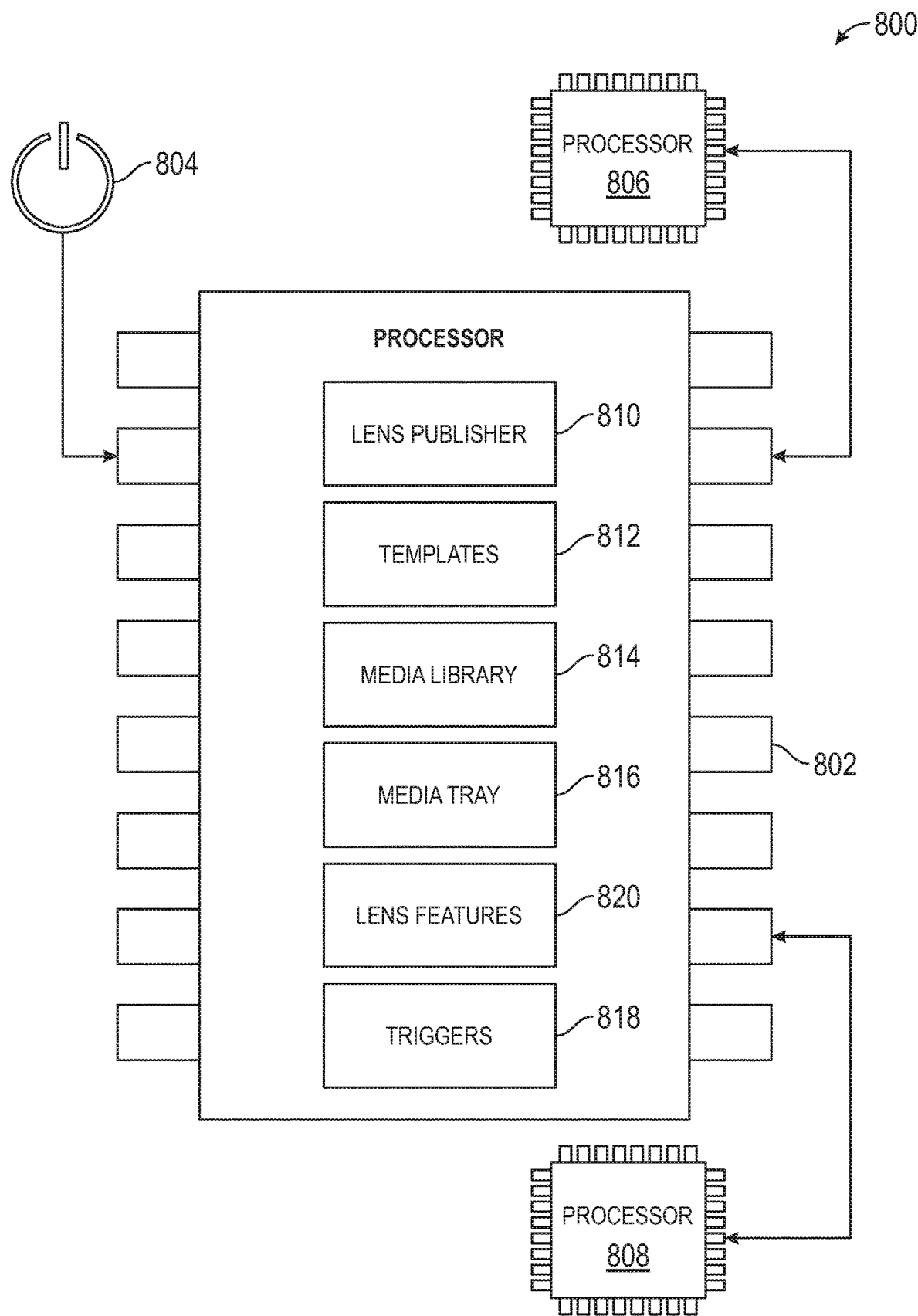
FIG. 8 is a diagrammatic representation of a processing environment, in accordance with some example embodiments.

Turning now to FIG. 8, there is shown a diagrammatic representation of a processing environment 800, which includes the processor 806, the processor 808, and a processor 802 (e.g., a GPU, CPU or combination thereof).

The processor 802 is shown to be coupled to a power source 804, and to include (either permanently configured or temporarily instantiated) modules, namely a lens publisher 810, templates 812, a media library 814, a media tray 816, lens features 820, and triggers 818. The lens publisher 810 enables a user to build a lens (augmented reality feature) via a template from templates 812 and/or using features from lens features 820. Templates 812 includes a plurality (e.g., hundreds to thousands) of previously created lenses that comprise a plurality of features. Media library 814 stores the user-created lens. The media tray 816 comprises user files, such as logo, music, sound files, Triggers 818 include actions detected by a camera or other input device that activate the lens feature(s) in a lens.

The templates 812 can include templates for a variety industries and categories. For example, industry specific templates may include: Food & Beverage; Personal Care & Beauty; Automotive; Financial Services; Gaming; Travel & Tourism; Restaurants; Retail—Fashion & Apparel; Retail—General; Technology, Media & Telecommunications and others.

Lens categories may include: Most popular; Upcoming holidays; Party; humor ("LOL"); Animals; Beauty; Accessories; Morphing; Characters and others. Other 3D lens categories may include animals, ears, lol, beauty, regional, glasses, accessories, characters, morphing, India, cartoon, makeup, flowers, pink, cat, bear, Japanese, playful/lol, and sunglasses.

Lens features 820 may include adding a Headdress to an image/video (e.g., self photograph), including: Hat; Headband; Cap; Party hat, etc.; adding Glasses to an image/video including: Sunglasses; Cartoon; etc.; adding visual effects to an image/video including: Bokeh; Confetti; Weather (e.g., snow), etc.; adding color filters to an image/video including Various colors or Vignette, etc.; apply facial effects to an image/video including: Shape/morphing; Smooth skin; adding Eyelashes; applying Lipstick; applying blush, etc. Accordingly, lens features 820 including identifying a relevant body part (e.g., eyes, hair, lips, cheeks, etc.) and overlaying/applying images/effects over the identified body part.

Further, uploaded files in the media tray 816 can be used in lens features 820. For example, for a Logo, the lens publisher 810 can move, scale, rotate, and delete. The same actions can apply to a product image and Gifs in the media tray 816.

Triggers 818 can include actions that activate one or more lens features in a lens. Example triggers include: Open mouth; Raise eyebrows; Tap; Blow a kiss; Smile, etc.

Accordingly, an example lens for the food and beverage industry might be displaying a pizza image over a person's mouth that is triggered by the person opening his/her mouth while simultaneously displaying a logo of a restaurant.

Figure 9:
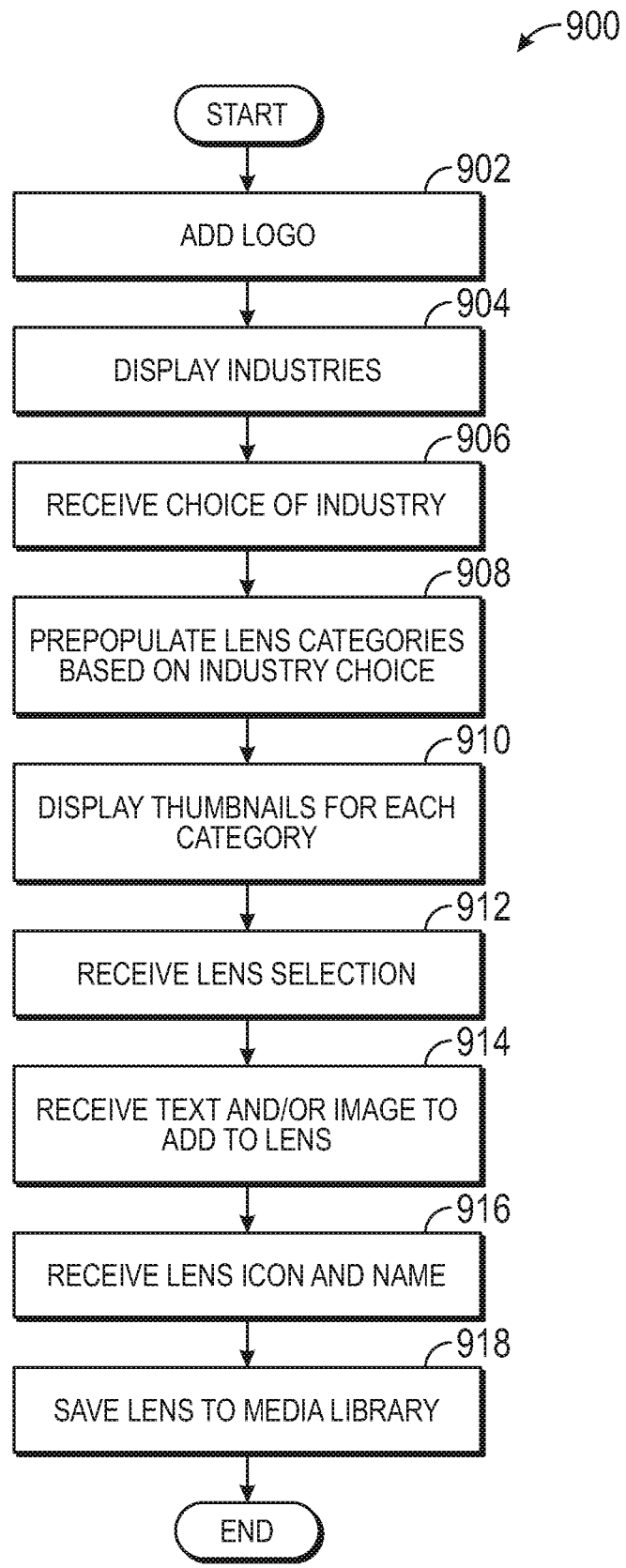
FIG. 9 illustrates a method of generating an augmented reality lens in accordance with one embodiment.

FIG. 9 illustrates a method 900 of generating an augmented reality lens from a template in accordance with one embodiment. First, a logo is added (add logo 902) either via receiving an upload from a user or the user selecting from the media tray 816. Then the lens publisher 810 displays industries for the user to select (display industries 904) and receives a selection (receive choice of industry 906). The lens publisher 810 then prepopulates lens categories based on industry choice 908 and displays lens (e.g., under thumbnails) for each category 910. The lens publisher 810 then receives lens selection 912 from a user selection. The lens publisher 810 then receives text and/or image to add to lens 914, if any, from the user. Then the lens publisher 810 receives lens icon and name 916 and saves lens to media library 918. The method 900 then ends. Note that the method can be performed in an order other than that described above. For example, add logo 902 can be performed after Receive text and/or image to add to lens 914. Further, many parts of method 900 are optional, such as the add logo 902.

Once a lens is generated, the user or other users can access the lens to generate an augmented reality and transmit it within a message to another user.

Figure 10:
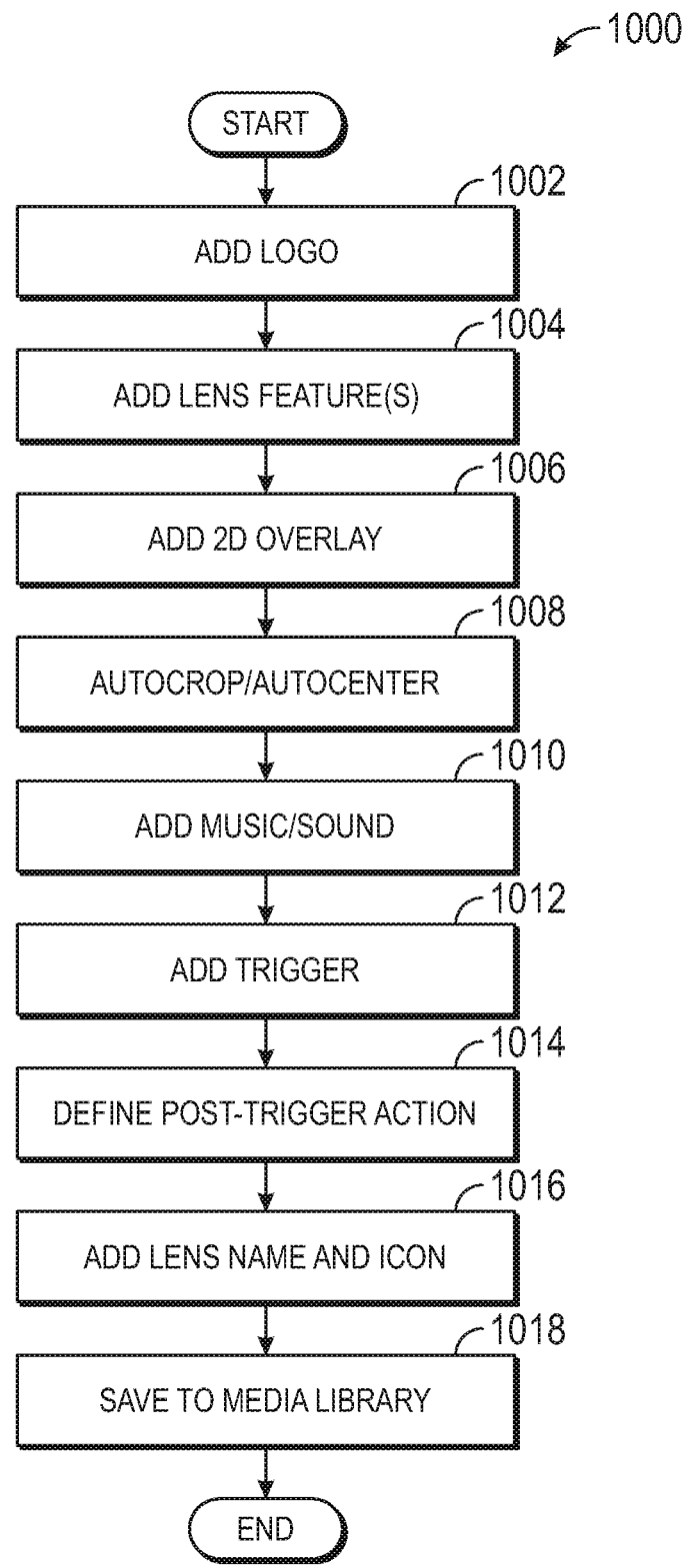
FIG. 10 illustrates a method of generating an augmented reality lens in accordance with one embodiment.

FIG. 10 illustrates a method 1000 of generating an augmented reality lens in accordance with one embodiment. The method 1000 comprises adding logo 1002 either via receiving an upload from a user or the user selecting from the media tray 816. In another embodiment, a logo can be pulled from a user's website or app and added to the media tray 816 for use. Next a lens feature from lens features 820 is added (1004) based on a user selection of displayed lens features 820. The display of lens features 820 can be organized based on categories, such as industry, event (e.g., holiday) animals, etc. selected by a user. A 2D overlay can then be added (1006), which can be autocropped and/or centered (1008). Music/sound can then be added (1010) via an uploaded sound file, e.g., from the media tray 816. A trigger from triggers 818 can then be added (1012). A post-trigger action can then be defined (1014) for the trigger, e.g., activating the selected lens feature(s) or a portion of the selected lens feature. A lens name and/or icon can then be added (1016) and the completed lens is saved (1018) to the media library 814. The method 1000 then ends.

Note that the method can be performed in an order than that described above. For example, add logo (1002) can be performed the add lens (1016) Further, many parts of method 1000 are optional, such as the add logo (1002).

Once a lens is generated, the user or other users can access the lens to generate an augmented reality and transmit it within a message to other users.

Figure 11:
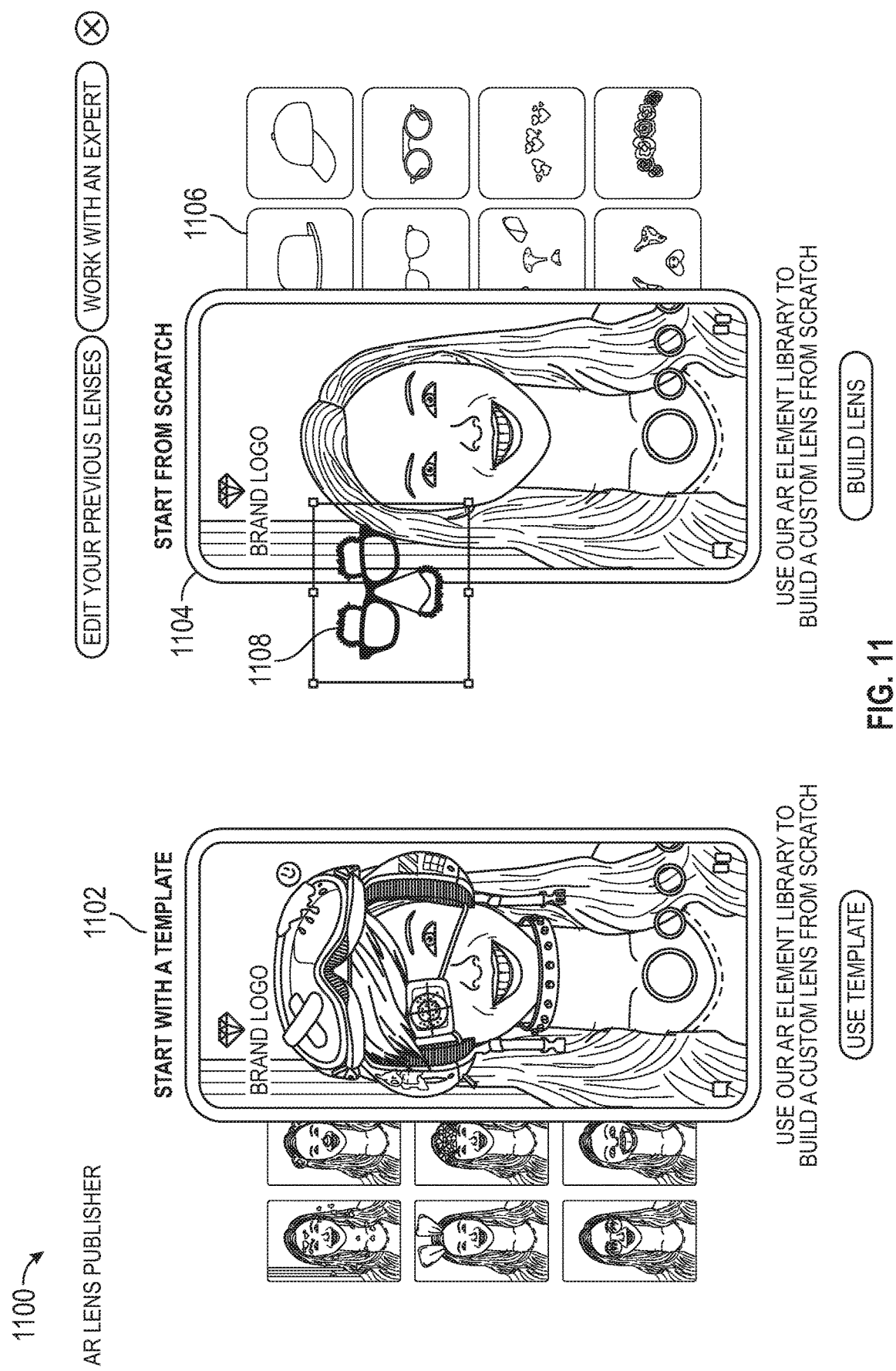
FIG. 11 illustrates a screen shot of a lens publisher GUI presenting a choice of lens type creation method.

FIG. 11 illustrates a screen shot of a lens publisher graphical user interface GUI 1100 presenting a choice of lens type creation method. A user can the GUI 1100 to select either starting with a template 1102 corresponding to method 900 or generating a new lens 1104 corresponding to method 1000 using features 1106, such as feature 1108, e.g., Groucho glasses.

Figure 12:
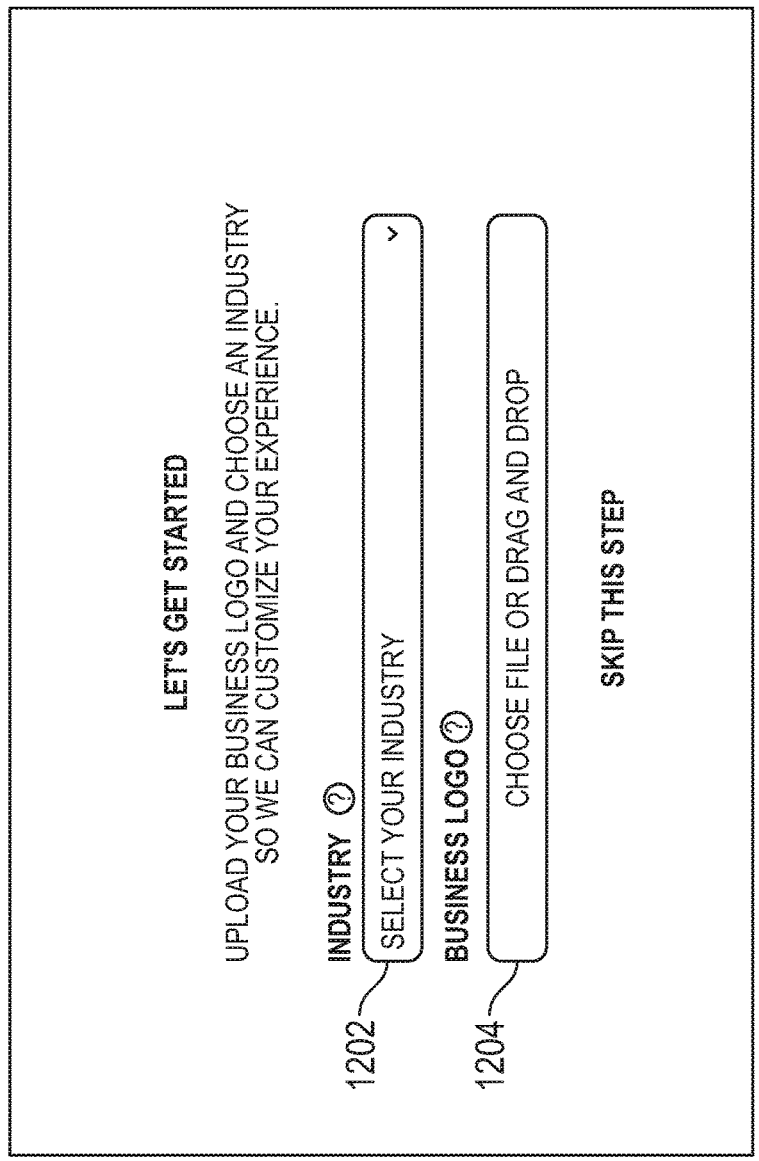
FIG. 12 illustrates a screen shot of the lens publisher presenting industry selection input.
Figure 12:
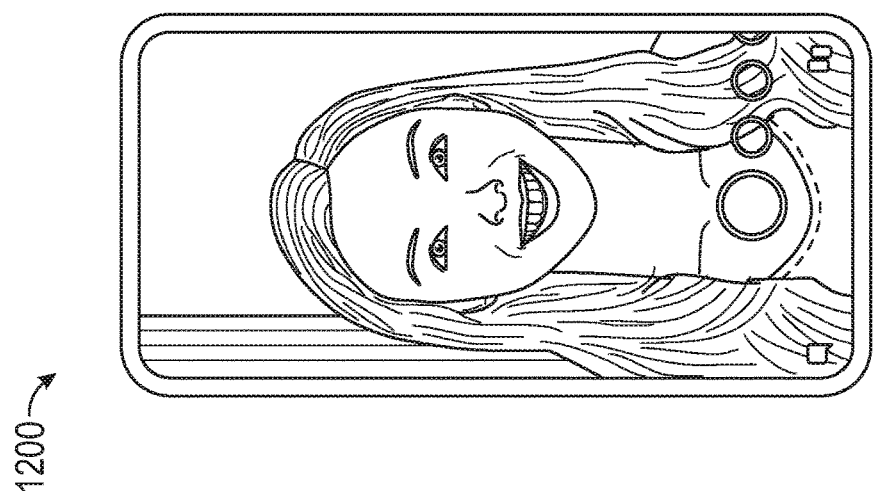

FIG. 12 illustrates a screen shot of the lens publisher GUI 1200 presenting industry selection input. If a user proceeds to generate a lens via method 900, the user can select an industry in item 1202 and upload a logo in item 1204. Selecting an industry will cause lens publisher 810 to prepopulate lens categories based on industry choice 908.

Figure 13:
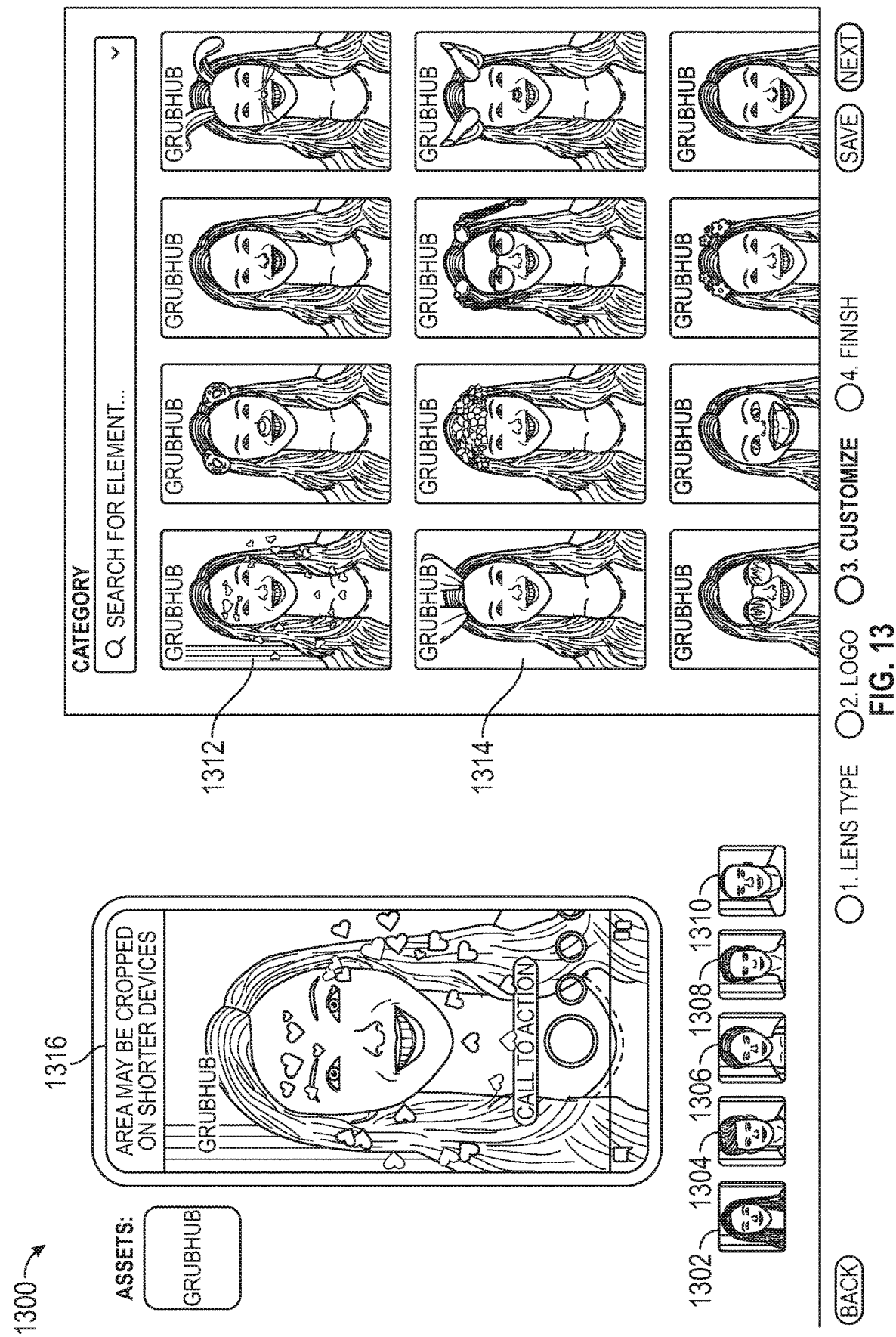
FIG. 13 illustrates a screen shot of the lens publisher generating an augmented reality effect.

FIG. 13 illustrates a screen shot of the lens publisher GUI 1300 generating an augmented reality effect. Assuming a user is generating a new lens (method 1000), the user can select one or more lens features from lens features 820, such as item 1312 or item 1314. After selection, the effect of the feature can be viewed on a mobile phone screen reproduction 1316. Further, photographs of various of people of various races, genders, etc. can by cycled through to confirm the feature is effective on various people. For example, item 1302-item 1310.

Figure 14:
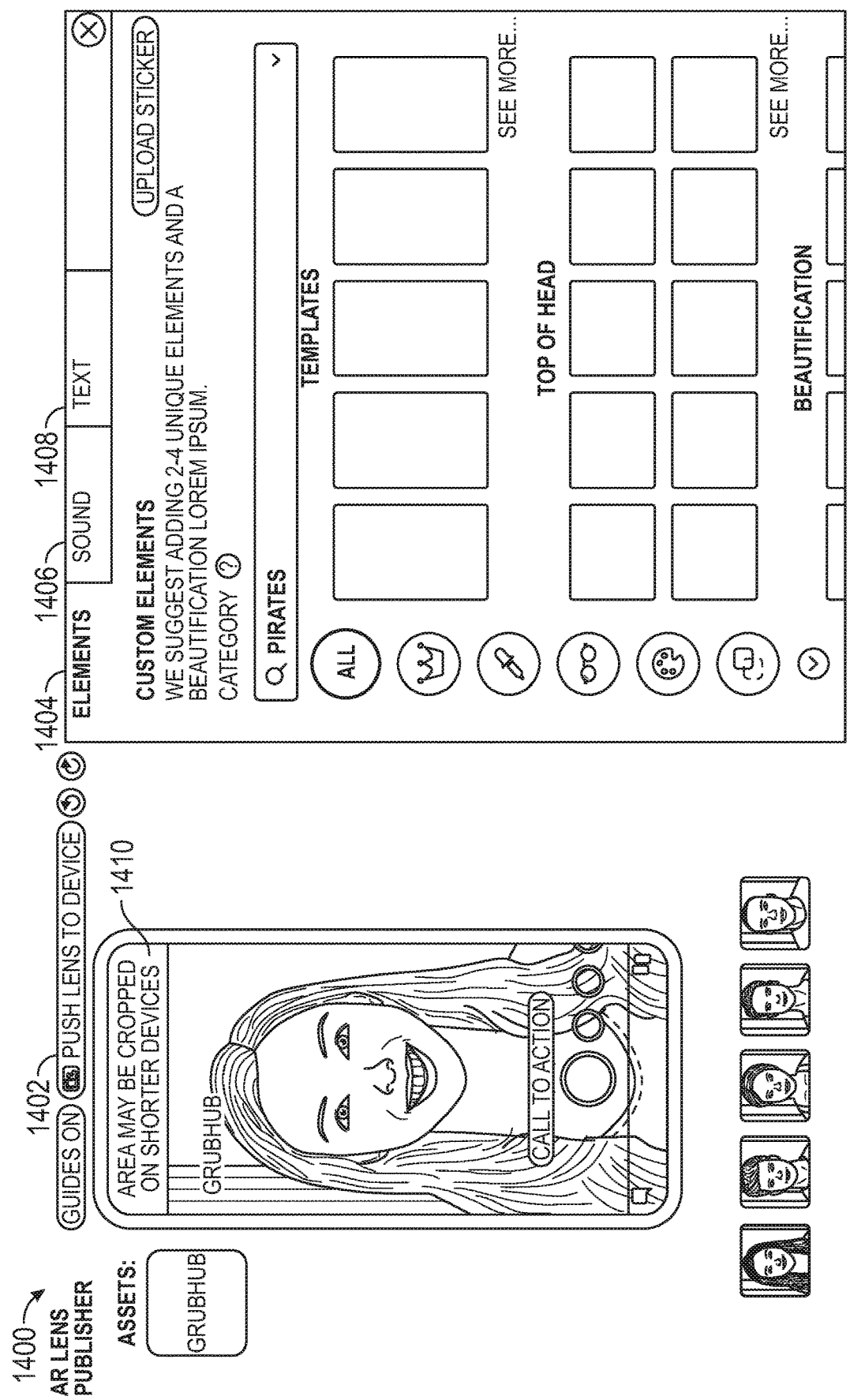
FIG. 14 illustrates a screen shot of the lens publisher generating an augmented reality effect.

FIG. 14 illustrates a screen shot of the lens publisher GUI 1400 generating an augmented reality effect. Various elements can be added to a lens, such as templates, top of head lens features (e.g., item 1314), beautification, etc. In addition, sounds and text can be added to the lens via tab 1406 and tab 1408. Once a lens is completed, it can be pushed to device by a user pressing button 1402. The lens publisher 810 will then push the generated lens to the mobile phone screen reproduction 1410 and/or a mobile device communicatively coupled to the lens publisher 810.

Figure 15:
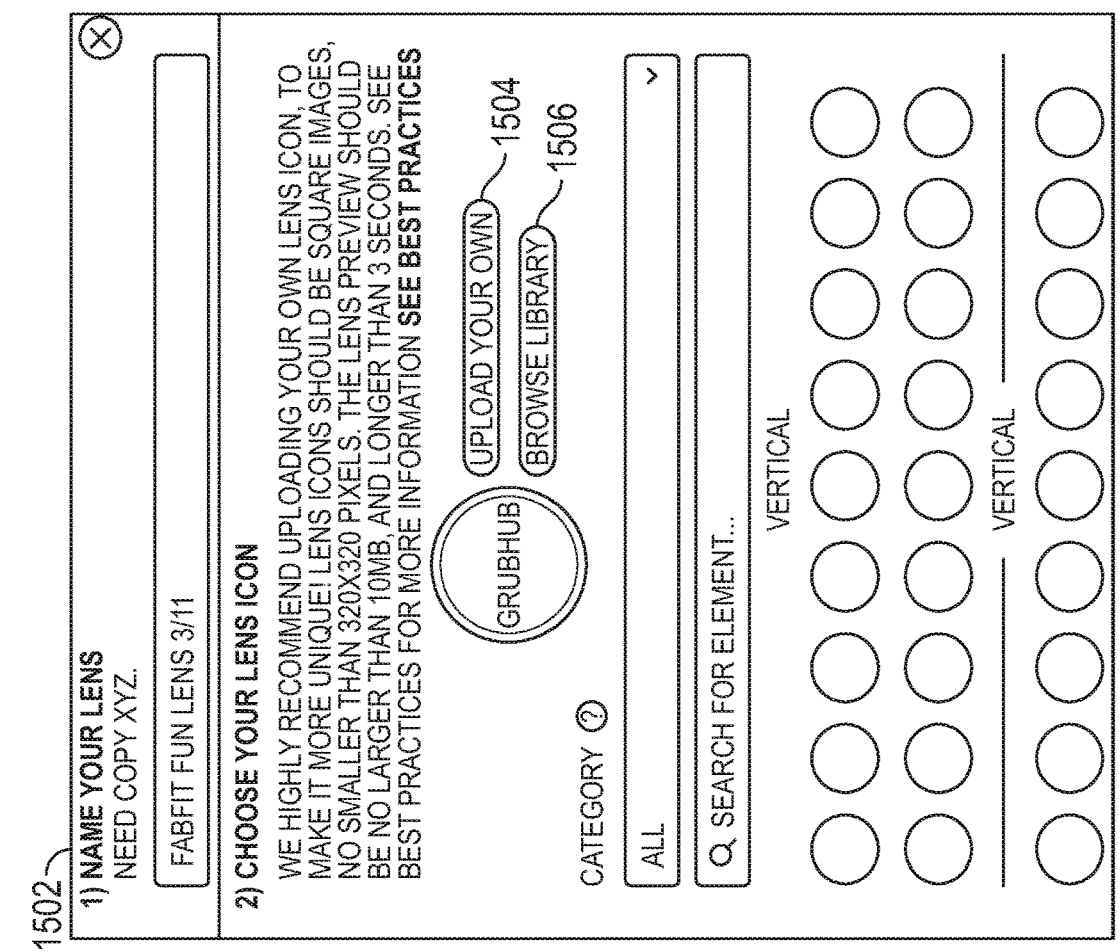
FIG. 15 illustrates a screen shot of the lens publisher saving a generated augmented reality lens.
Figure 15:
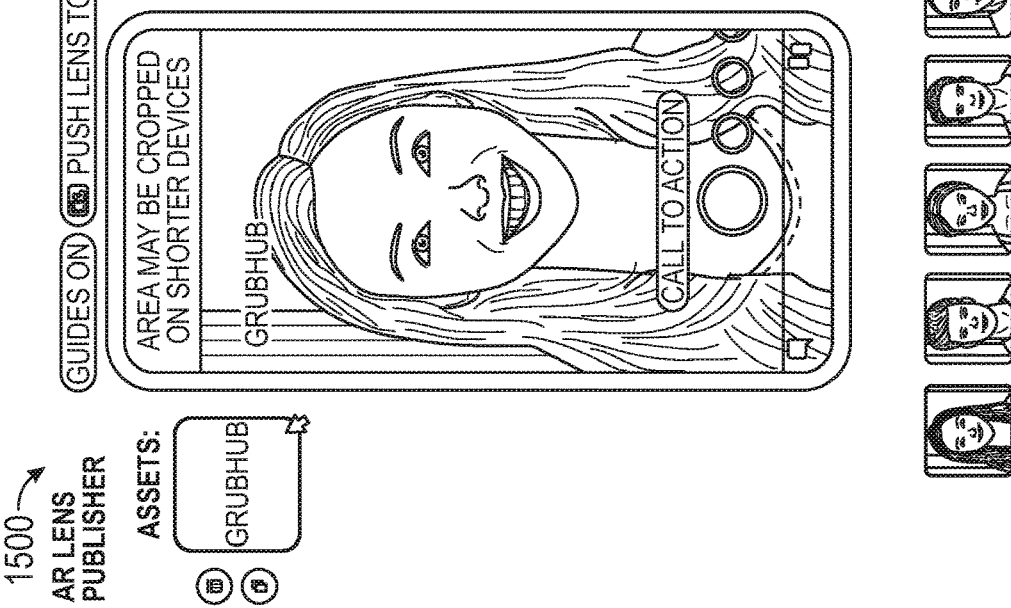

FIG. 15 illustrates a screen shot of the lens publisher GUI 1500 saving a generated augmented reality lens. The lens can be saved at item 1502 and a lens icon be uploaded at item 1504 or a saved icon (e.g., from the media tray 816) can be used at item 1506.

In addition to the above, a user can access existing assets in the media tray 816 and save uploaded assets from lens publisher 810 into the same media tray 816. Lens publisher 810 also provides template swapping functionality. A user can change template of a Lens to Template B after user has started creating a Lens in Template A. This action automatically puts user-uploaded assets (e.g., logo) into Template B.

In an embodiment, a User can click a button in the GUI 1500 that duplicates their exact Lens with pre-set changes in it to make a second Lens variant that they can use for creative variant testing. This action does not overwrite first Lens Four variants can be automatically created (user has ability to add or delete variants). The automatically generated variants can follow the rules below:

Automatic variant creation should change:
If face effects from Lens Publisher 810 exist, auto-adjust the face effect (e.g., increase beautification) for the variant.
If 3D assets from Lens Publisher 810 exist, switch the 3D asset with another one from the same category (e.g., for hat, switch with different hat to create 1 variant).
If no 3D assets from Lens Publisher 810 exist AND user used a template, use the template swapping functionality described above to create variants with different templates.
If no 3D assets from Lens Publisher 810 exist AND user did not use a template (e.g., user only customized with text/logo/images), change logo sizing, text sizing, and color tint of image.

Accordingly, the lens publisher 810 and related methods enable a user to generate augmented reality lenses faster than conventional methods.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Ephemeral Message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

As described above, lenses in accordance with embodiments described herein refer to modifications that may be made to videos or images. This includes both real-time modification which modifies an image as it is captured using a device sensor and then displayed on a screen of the device with the lens modifications. This also includes modifications to stored content, such as video clips in a gallery that may be modified using lenses. For example, in a creator profile with multiple lenses, an authorized third party account may use a single video clip with multiple lenses to see how the different lenses will modify the stored clip. Similarly, real-time video capture may be used with a lens to show how video images currently being captured by sensors of a device would modify the captured data. Such data may simply be displayed on the screen and not stored in memory, or the content captured by the device sensors may be recorded and stored in memory with or without the lens modifications (or both).

Lens data and various systems to use lenses and modify content using lenses may thus involve detection of objects (e.g. faces, hands, bodies, cats, dogs, surfaces, objects, etc), tracking of such objects as they leave, enter, and move around the field of view in video frames, and the modification or transformation of such objects as they are tracked. In various embodiments, different methods for achieving such transformations may be used. For example, some embodiments may involve generating a three dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using lenses, such as a human's face and parts of a human body, animals, or non-living things such as chairs, cars, or other objects.

In some embodiments, when a lens is selected along with content to be transformed, elements to be transformed by the lenses are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used.

In some embodiments of lenses using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, lenses may be used by a system where a user may capture an image or video stream of the user (e.g., a selfie) using a client device 102 having a neural network operating as part of a messaging application 104 operating on the client device 102. The transform system operating within the messaging application 104 determines the presence of a face within the image or video stream and provides modification icons associated with the lenses, or the lenses may be present as associated with an interface described herein. The modification icons include changes which may be the basis for modifying the user's face within the image or video stream as part of the lens operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and lens selection (e.g. initiation from a content creator user interface). In various embodiments, a modification may be persistent after an initial selection of a modification icon. The user may toggle the modification on or off by tapping or otherwise selecting the face being modified by the transformation system. and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

Example embodiments include:
1. A computer-implemented method of generating an augmented reality lens, comprising:
   causing to display a list of lens categories on a display screen of a client device;
   receiving a user choice from the displayed list;
   causing to prepopulate a lens features display on the display device based on the user choice, wherein each lens feature comprises image transformation data configured to modify or overlay video or image data;
   receiving a user selection of a lens feature from the prepopulated lens display;
   receiving a trigger selection that activates the lens feature to complete the lens; and
   saving the completed lens to a memory of a computer device.
2. The method of example 1, further comprising generating a message using the completed lens and transmitting the message to another client device.
3. The method of example 2, wherein the message is an Ephemeral Message.
4. The method of example 1, further comprising receiving a post-trigger action definition.
5. The method of example 1, further comprising receiving a 2D overlay and adding it to the lens.
6. The method of example 1, further comprising receiving a sound file and adding it to the lens.
7. The method of example 1, wherein the lens feature includes morphing an image.
8. The method of example 1, wherein the lens feature includes overlaying a second image over a first image.
9. The method of example 8, further comprising identifying a body part in the first image and overlaying the second image over the identified body part.
10. A computer-implemented method of generating an augmented reality lens, comprising:
    causing to display a list of industries on a display screen of a client device;
    receiving a user choice of an industry from the displayed list;
    causing to prepopulate a lens categories display on the display screen with lens templates based on the user choice;
    receiving a user selection of a lens template from the prepopulated lens categories; wherein each lens template comprises image transformation data configured to modify or overlay video or image data;
    saving the selected lens template to memory of a computing device; and
    transmitting a message generated with the saved lens template via an ephemeral messaging system.
11. A system for generating an augmented reality lens, comprising:
    one or more processors of a machine;
    a memory storing instruction that, when executed by the one or more processors, cause the machine to perform operations comprising:
    causing to display a list of lens categories on a display screen of a client device;
    receiving a user choice from the displayed list;
    causing to prepopulate a lens features display on the display device based on the user choice, wherein each lens feature comprises image transformation data configured to modify or overlay video or image data;
    receiving a user selection of a lens feature from the prepopulated lens display;
    receiving a trigger selection that activates the lens feature to complete the lens; and
    saving the completed lens to a memory of a computing device.
12. The system of example 11, wherein the operations further comprise generating a message using the completed lens and transmitting the message to another client device.
13. The system of example 12, wherein the message is an Ephemeral Message.
14. The system of example 11, wherein the operations further comprise receiving a post-trigger action definition.
15. The system of example 11, wherein the operations further comprise receiving a 2D overlay and adding it to the lens.
16. The system of example 11, wherein the operations further comprise receiving a sound file and adding it to the lens.
17. The system of example 11, wherein the lens feature includes morphing an image.
18. The system of example 11, wherein the lens feature includes overlaying a second image over a first image.
19. The system of example 18, wherein the operations further comprise identifying a body part in the first image and overlaying the second image over the identified body part.
20. A machine-readable storage device embodying instructions that, when executed by a machine, cause the machine to perform operations comprising:
    causing to display a list of lens categories on a display screen of a client device;
    receiving a user choice from the displayed list;
    causing to prepopulate a lens features display on the display device based on the user choice, wherein each lens feature comprises image transformation data configured to modify or overlay video or image data;
    receiving a user selection of a lens feature from the prepopulated lens display;
    receiving a trigger selection that activates the lens feature to complete the lens; and
    saving the completed lens to a memory of a computing device.

What is claimed is:

1. A computer-implemented method of generating an augmented reality lens, comprising:
   receiving a selection of a facial lens template from a prepopulated lens template display, the selected facial lens template comprising image transformation data configured to overlay video of a face;
   receiving a trigger selection that activates a facial lens feature of the selected lens template to complete customization of the facial lens template, thereby forming a completed facial lens, the trigger selection including detection of a facial action by a camera thereby triggering the overlay; and
   saving the completed facial lens to a memory.

2. The method of claim 1, further comprising generating a message using the completed facial lens and transmitting the message to another client device.

3. The method of claim 1, further comprising receiving a post-trigger action definition.

4. The method of claim 1, further comprising receiving a 2D overlay and adding it to the facial lens.

5. The method of claim 1, further comprising receiving a sound file and adding it to the facial lens.

6. The method of claim 1, wherein the facial lens feature of the selected lens template includes morphing an image.

7. The method of claim 1, wherein the facial lens feature of the selected lens template includes overlaying a second image over a first image.

8. The method of claim 7, further comprising identifying a body part in the first image and overlaying the second image over the identified body part.

9. A system for generating an augmented reality lens, comprising:
one or more processors of a machine;
a memory storing instructions that, when executed by the one or more processors, cause the machine to perform operations comprising:
receiving a selection of a facial lens template from a prepopulated lens template display, the selected facial lens template comprising image transformation data configured to overlay video of a face;
receiving a trigger selection that activates a facial lens feature of the selected lens template to complete customization of the facial lens template, thereby forming a completed facial lens, the trigger selection including detection of a facial action by a camera thereby triggering the overlay; and
saving the completed facial lens to a memory.

10. The system of claim 9, wherein the operations further comprise generating a message using the completed facial lens and transmitting the message to another client device.

11. The system of claim 9, wherein the operations further comprise receiving a post-trigger action definition.

12. The system of claim 9, wherein the operations further comprise receiving a 2D overlay and adding it to the facial lens.

13. The system of claim 9, wherein the operations further comprise receiving a sound file and adding it to the facial lens.

14. The system of claim 9, wherein the facial lens feature of the selected facial lens template includes morphing an image.

15. The system of claim 9, wherein the facial lens feature of the selected facial lens template includes overlaying a second image over a first image.

16. The system of claim 15, wherein the operations further comprise identifying a body part in the first image and overlaying the second image over the identified body part.

17. The system of claim 9, wherein the facial lens feature applies facial effects to a video or image data of a face.

18. A machine-readable storage device embodying instructions that, when executed by a machine, cause the machine to perform operations comprising:
receiving a selection of a facial lens template from a prepopulated lens template display from a prepopulated lens template display, the selected facial lens template comprising image transformation data configured to overlay video of a face;
receiving a trigger selection that activates a facial lens feature of the selected lens template to complete customization of the facial lens template, thereby forming a completed facial lens, the trigger selection including detection of a facial action by a camera thereby triggering the overlay; and
saving the completed facial lens to a memory.

* * * * *